United States Patent [19]

Torii

[11] Patent Number: 4,889,233

[45] Date of Patent: Dec. 26, 1989

[54] CASSETTE FOR STIMULABLE PHOSPHOR SHEET

[75] Inventor: Shumpeita Torii, Kanagawa, Japan

[73] Assignee: Fuji Photo Film Co., Ltd., Kanagawa, Japan

[21] Appl. No.: 110,295

[22] Filed: Oct. 20, 1987

[30] Foreign Application Priority Data

Oct. 20, 1986 [JP] Japan .................................. 61-249084
Oct. 20, 1986 [JP] Japan .................................. 61-249085

[51] Int. Cl.$^4$ ............................................ B65D 85/00
[52] U.S. Cl. ...................................... 206/455; 378/182
[58] Field of Search ................. 206/454, 455; 378/182, 378/187

[56] References Cited

U.S. PATENT DOCUMENTS 1,101,907  6/1914  Cummings ........................... 206/455
3,091,327  5/1963  Lalley ................................. 206/455
3,710,977  1/1973  Enden et al. ..................... 206/455 X
4,444,484  4/1984  Best et al. ....................... 206/455 X
4,498,005  2/1985  Oono et al. .

FOREIGN PATENT DOCUMENTS 1056922  5/1959  Fed. Rep. of Germany ...... 206/455
2634163  7/1976  Fed. Rep. of Germany ...... 206/455

Primary Examiner—William Price
Attorney, Agent, or Firm—Sughrue, Mion, Zinn, Macpeak & Seas

[57] ABSTRACT

A cassette for a stimulable phosphor sheet, includes a casing for storing the stimulable phosphor sheet therein, a cover openably and closably mounted on a portion of the casing, and a light-shielding plate mounted on the remaining portion of the casing for cooperating with the cover in keeping the stored stimulable phosphor sheet in a light-shielded condition. The stimulable phosphor sheet can be taken out of the casing by opening the cover. The cover has at least one locking finger normally urged by a spring to engage the casing to lock the cover in a closed position. The locking finger may be displaced by a presser pin inserted through a hole defined in a side of the casing or a hole defined in a bottom of the casing for unlocking the cover from the casing.

14 Claims, 7 Drawing Sheets

CASSETTE FOR STIMULABLE PHOSPHOR SHEET

BACKGROUND OF THE INVENTION

The present invention relates to a cassette for a stimulable phosphor sheet, and more particularly to a cassette for storing a stimulable phosphor sheet in a light-shielded condition and loading them into an image recording device or the like, the cassette being arranged to allow a simple mechanism to take the stimulable phosphor sheet out of and/or into the cassette, to be loaded in a variety of selectable positions or attitudes, to take up a small space, and having lock means for securely closing an openable cover of the cassette, the locking means being releasable by pressing forces applied in various different directions.

There has recently been developed and widely used a radiation image recording and reproducing system for producing the radiation-transmitted image of an object using a stimulable phosphor material capable of emitting light upon exposure to stimulating rays. When a certain phosphor is exposed to a radiation such as X-rays, cathode rays, ultraviolet rays, and the like, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded on a recording medium such as a photosensitive material or displayed as a visible image on a CRT or the like.

The radiation image recording and reproducing system includes an image reading device for reading the radiation image recorded on a stimulable phosphor sheet. The image reading device reads the radiation image as follows:

The stimulable phosphor sheet is two-dimensionally scanned by a light beam such as a laser beam, and light emitted from the stimuable phosphor sheet in response to application of the light beam is detected by a light detector such as a photomultiplier or the like, thereby obtaining image information. The two-dimensional scanning of the stimulable phosphor sheet with the light beam is effected by mechanially feeding the stimulable phosphor sheet in one direction for auxiliary scanning, while deflecting the light beam for main scanning in a direction normal to the direction in which the stimulable phosphor sheet is fed.

For recording an image on a stimulable phosphor sheet in an image recording device, an object to be imaged is exposed to radiation, and the stimulable phosphor sheet stored in a cassette is then exposed to the radiation having passed through the object for recording the radiation image on the stimulable phosphor sheet. The stimulable phosphor sheet as it is carried in the cassette is then loaded into the image reading device, in which the stimulable phosphor sheet is taken out of the cassette by a sheet delivery mechanism and delivered to a position where the sheet is scanned by the light beam.

One general cassette construction will be described with reference to FIG. 1 of the accompanying drawings.

A conventional cassette 2 has a casing 6 defining a chamber 4 for storing a stimulable phosphor sheet S therein and a cover 10 angularly movably mounted on one end of the casing 6 by means of a hinge 8.

The cassette 2 is loaded into an image reading device 12, for example, in which the cover 10 is opened by a suction disk or cup 14 to open the chamber 4 into the image reading device 12. Then, a sheet delivery mechanism including a suction cup 16 is operated to attract and pick up the stimulable phosphor sheet S, which is thereafter fed to a scanning reader by a sheet feed mechanism, not shown.

As indicated by the broken lines in FIG. 1, when taking the stimulable phosphor sheet S out of the conventional cassette 2, the stimulable phosphor sheet S must be fanned so as to be prevented from abutting against a front wall 6a of the casing 6 remote from the hinge 8. Therefore, the sheet delivery mechanism is complex since it must displace the suction cup 16 along a path to fan the stimulable phosphor sheet S when it is taken out of the cassette 2.

The cover 10 is turned about one end of the casing 6 for opening the chamber 4 into the image reading device 12. Thus, the image reading device 12 should have a large space therein for allowing opening and closing movement of the cover 10. The image reading device 12 is of a large size since it must store the cassette 2 in its entirety.

For reading information from stimulable phosphor sheets of different sizes, there has to be as many different cassettes 2 as the number of different sheet sizes. Opening and closing the covers 10 of such different cassettes 2 with the same suction cup 14 poses a certain problem. More specifically, when a smaller cover 10 indicated by the dot-and-dash lines in FIG. 1 is to be opened, the cover 10 tends to be largely inclined vertically, making the suction cup 16 ineffective to attract the stimulable phosphor sheet S, which may then drop off the suction cup 16.

In FIG. 1, the cassette 2 is shown as being horizontally loaded into the image reading device 12. However, some image reading devices are arranged such that the cassette 2 should be loaded vertically downwardly in order to meet various demands. The cassette 2 shown in FIG. 1 cannot however be loaded into such image reading device, and hence is less versatile as it can only be used with limited types of image reading devices.

The cassette 2 generally has lock means (not shown) for locking the cover 10 in the closed position so that it will not be opened unless required. If the cover 10 were accidentally opened during delivery of the stimulable phosphor sheet S with a recorded radiation image to the image reading device 12, part of the recorded radiation image would be erased and the image could not correctly be read. Therefore, when carrying the cassette 2, the cover 10 is securely locked on the casing 6 by the non-illustrated lock means. After the cassette 2 has been loaded in the image reading device 2, the lock means is released by unlocking means (not shown) in the image reading device 12, and the cover 10 is opened for removal of the stimulable phosphor sheet S from the casing 6.

The lock means is generally arranged such that it can be released by a pressing force applied in one direction. The unlocking means is positioned in the image reading device 2 in the vicinity of the front end of the cassette 2 where the sheet will be taken out.

As described above, the image reading device 12 accommodates therein the sheet delivery mechanism for taking the stimulable phosphor sheet S from the cassette 2 and the sheet feed mechanism for feeding the stimulable phosphor sheet S to the scanning reader. Therefore, since the unlocking means is positionally limited, the positions where the sheet delivery mechanism and the sheet feed mechanism are located are also limited. As a result, it is difficult to reduce the size of the image reading device 12 in view of the above positional limitations therein. Inasmuch as the unlocking means is limited in position, the position or attitude in which the cassette 2 is loaded cannot freely be selected. As a consequence, the conventional cassette 2 is very poor in versatility and not economic.

SUMMARY OF THE INVENTION

It is a major object of the present invention to provide a cassette for a stimulable phosphor sheet which comprises a casing for storing the stimulable phosphor sheet therein and a cover openably and closably mounted on the casing for keeping the stored stimulable phosphor sheet in a light-shielded condition.

The cover has at least a length selected such that the stimulable phosphor sheet can be taken out of the casing. The cassette has a sheet removal slot defined between the casing and the cover, and lock means for locking the cover on the casing, the lock means being releasable in at least two directions. Therefore, the stimulable phosphor sheet can easily be taken out of the cassette. The cover can reliably be opened and closed. The cassette can be loaded in a selected position or attitude. The position of unlocking means in an image reading device can freely be selected. The space required in the image reading device for storing the cassette and allowing the cover to be opened and closed is greatly reduced.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
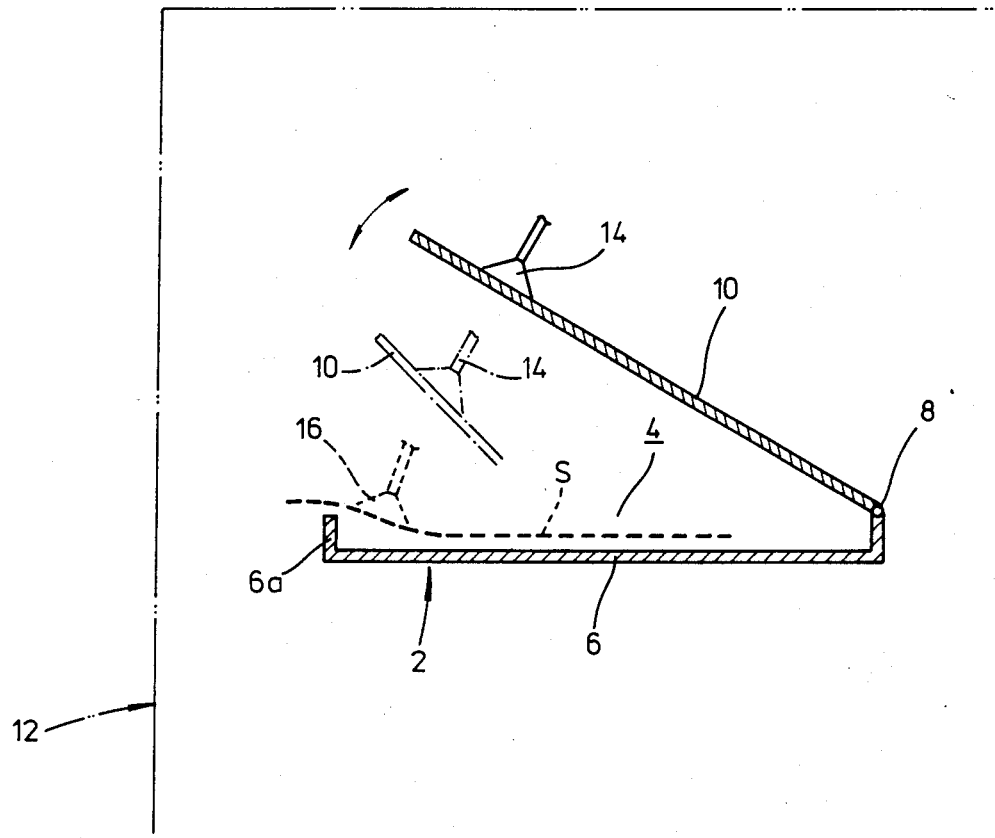
FIG. 1 is a schematic cross-sectional view of a conventional cassette for a stimulable phosphor sheet.
Figure 2:
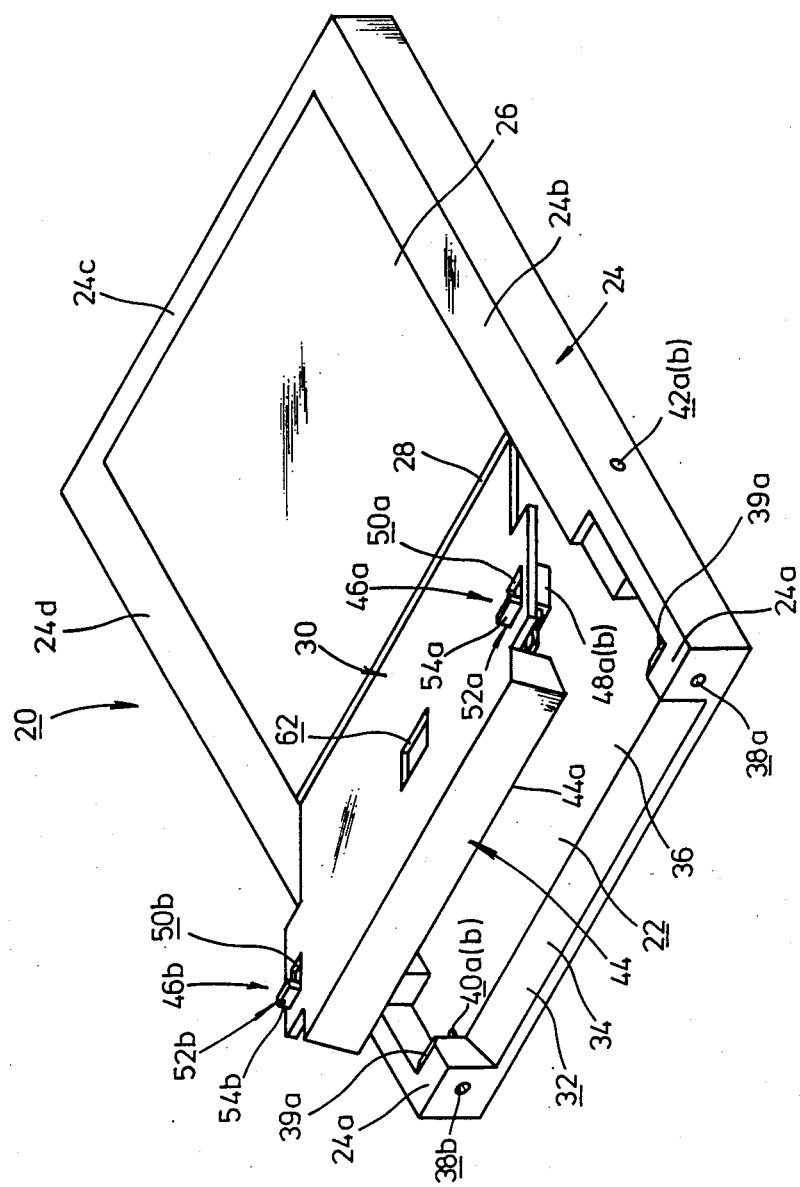
FIG. 2 is a perspective view of a cassette for a stimulable phosphor sheet according to the present invention.

As shown in FIG. 2, a cassette 20 for a stimulable phosphor sheet S basically comprises a casing 24 defining a chamber 22 for storing the stimulable phosphor sheets S, a light-shielding plate 26 closing the upper portion of the casing 24 at one end portion thereof, and a cover 30 swingably joined to the plate 26 by means of an integral hinge 28 and openable and closable with respect to the upper portion of the casing 24 at the other end portion thereof.

The casing 24 has four side walls 24a through 24d. The front side wall 24a where the stimulable phosphor sheets S can be removed from the chamber 22 has a sheet removal slot 32 defined therein and having a width larger than the width of the stimulable phosphor sheets S. The sheet removal slot 32 is partly defined by a surface 34 contiguous to an inner surface 36 of the casing 24 and inclined in a direction away from the cover 30. The side wall 24a also has laterally spaced holes 38a, 38b defined therethrough in a horizontal direction and laterally spaced ledges 39a (see also FIG. 4) projecting from an upper portion of the side wall 24a into the chamber 22 and having upper slanted surfaces. The inner surface 36 of the casing 24 has laterally spaced holes 40a, 40b vertically defined therethrough near the front side wall 24a. The holes 38a, 38b and 40a, 40b serve to insert therein presser pins for unlocking lock means (described later) on the cover 30. The other side walls 24b, 24d have holes 42a, 42b, respectively, for positioning the cassette 20 when it is loaded in an image reading device or the like.

The plate 26 which closes the upper portion of the casing 24 is detachably mounted on the casing 24 by means of stopper pins (not shown). Therefore, when the plate 26 is detached from the casing 24 by removing the stopper pins, the interior of the casing 24 can easily be cleaned or otherwise serviced.

The cover 30 openably and closably mounted on the casing 24 by the hinge 28 has a distal end movable toward and away from the casing 24 and having an engaging portion or projection 44 projecting toward the casing 24. The engaging portion 44 fits in the sheet removal slot 32 defined in the front side wall 24a of the casing 24. The engaging portion 44 has a surface 44a inclined complementarily to the surface 34. The cover 30 has two lock means 46a, 46b in its opposite sides.

Figure 3:
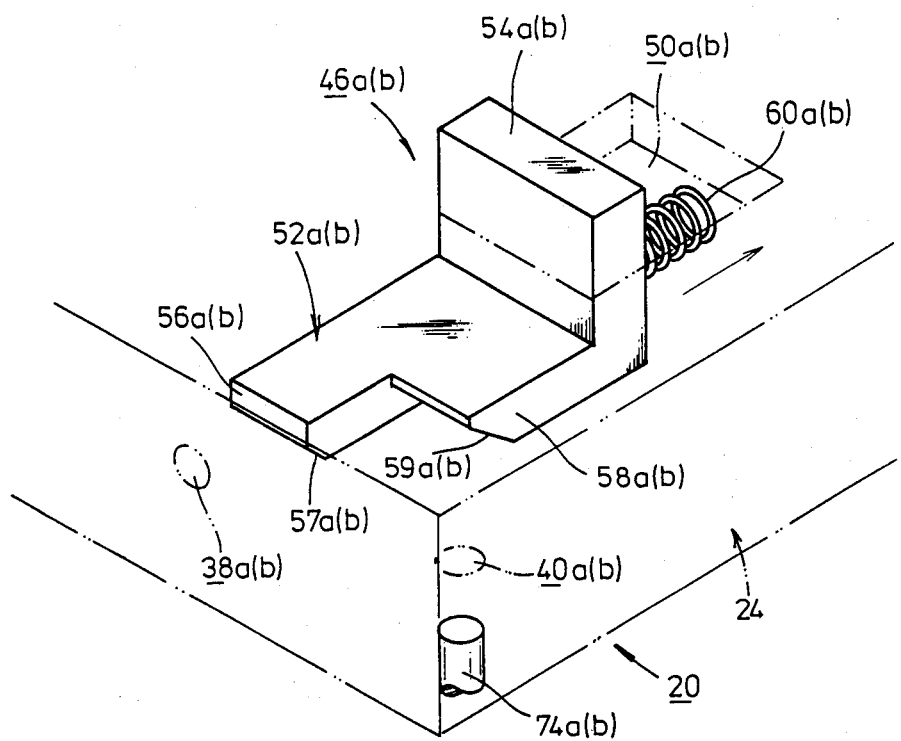
FIG. 3 is a perspective view, partly omitted from illustration, of lock means of the cassette shown in FIG. 2.
Figure 4:
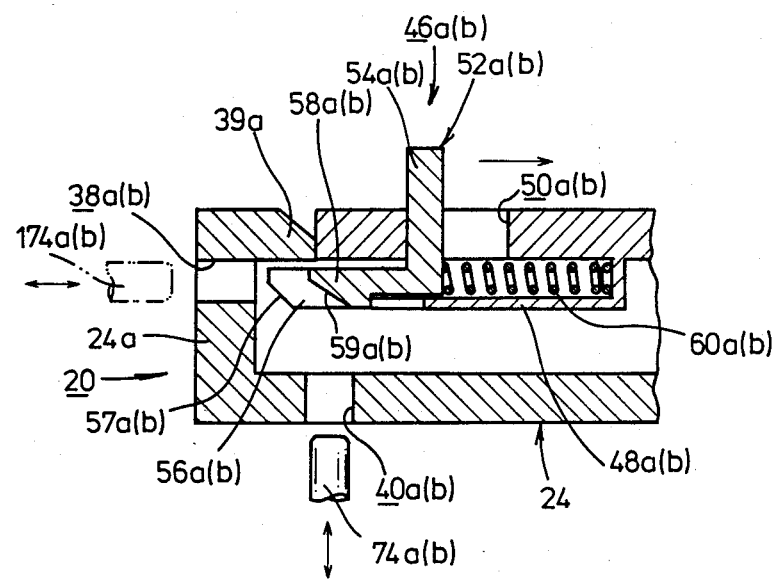
FIG. 4 is an enlarged fragmentary vertical cross-sectional view of the cassette of FIG. 2.

As shown in FIGS. 2 through 4, the lock means 46a includes a case 48a projecting from the inner surface of the cover 30, which has an opening 50a communicating with the interior of the case 48a. A locking finger 52a mounted in the case 48a comprises a lever 54a projecting through and exposed out of the opening 50a, a first locking member 56a extending perpendicularly to the lever 54a in confronting relation to the hole 38a defined in the side wall 24a, and a second locking member 58a formed on one side of the first locking member 46a and facing the hole 40a defined in the inner surface 36 of the casing 24 (see FIGS. 3 and 4). The first locking member 56a projects out beyond the second locking member 58a and has a slanted surface 57a for engaging in the ledge 39a of the side wall 24a. The second locking member 58a has a slanted surface 59a which can be engaged by a presser pin (described later) that enters into the casing 24 through the hole 40a. The locking finger 52a is normally urged resiliently toward the locking ledge 39a by a coil spring 60a disposed in the case 48a.

The other lock means 46b is of the mirror image of the lock means 46a. Those components of the lock means 46b which are identical to those of the lock means 46a are denoted by identical reference numerals with a suffix b, and will not be described in detail.

The cover 30 has a rectangular opening or window 62 defined therein (FIG. 2). An indicia such as a bar code or the like on the stimulable phosphor sheet stored in the cassette 20 can be read through the opening 62.

A radiation image information reading device for loading the cassette 20 therein will be described below.

Figure 5:
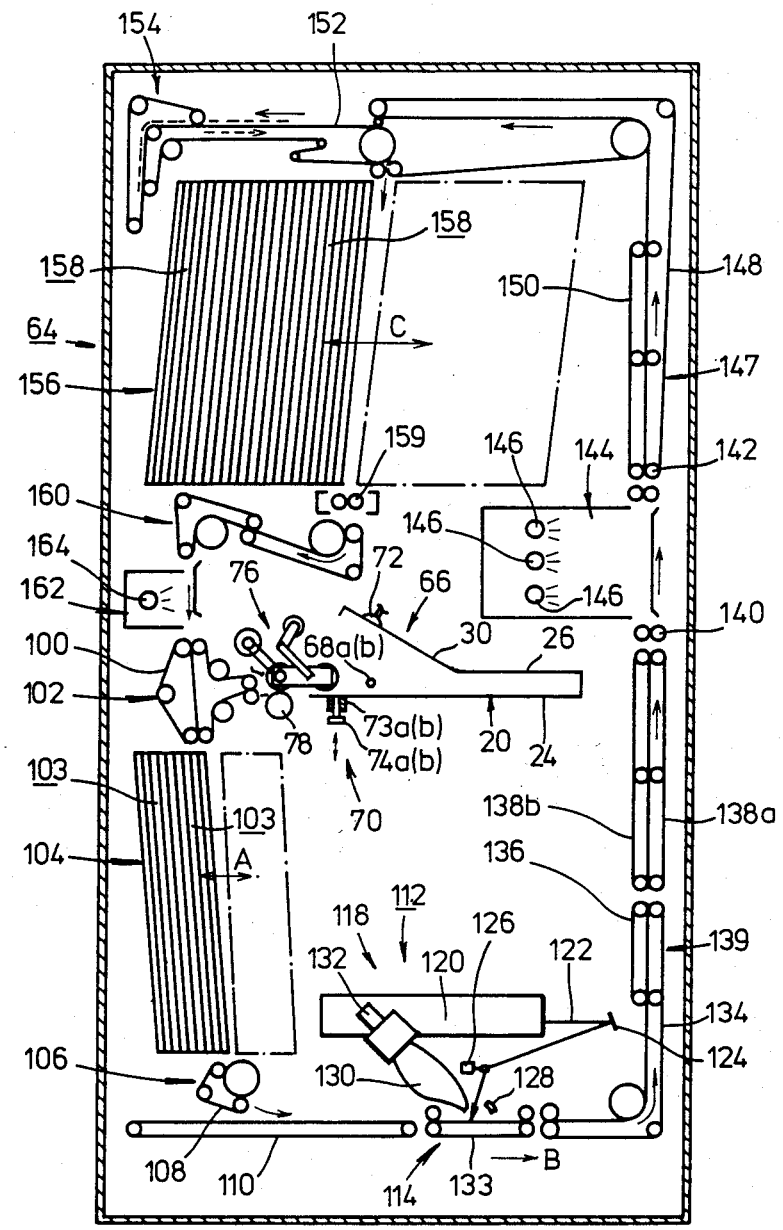
FIG. 5 is a schematic vertical cross-sectional view of a radiation image reading device in which the cassette of the invention is loaded.

As shown in FIG. 5, a radiation image information reading device 64 has a cassette holder 66 located substantially centrally therein for detachably mounting the cassette 20 therein. The cassette holder 66 comprises fixing means including engaging pins 68a, 68b for fitting in the respective holes 42a, 42b of the casing 24 to position the cassette 20 in place, unlocking means 70 for releasing the lock means 46a, 46b of the cover 30, and cover opening/closing means including a suction cup 72 for opening and closing the cover 30. The unlocking means 70 includes pin retainers 73a, 73b and presser pins 74a, 74b that can be fitted respectively in the pin retainers 73a, 73b and slidably displaced into the respective holes 40a, 40b of the casing 24 in response to operation of an actuator (not shown).

The unlocking means 70 is disposed below the casing 24 for releasing the lock means 46a, 46b through the holes 40a, 40b. However, the lock means 46a, 46b may be released through the holes 38a, 38b of the casing 24.

Figure 6:
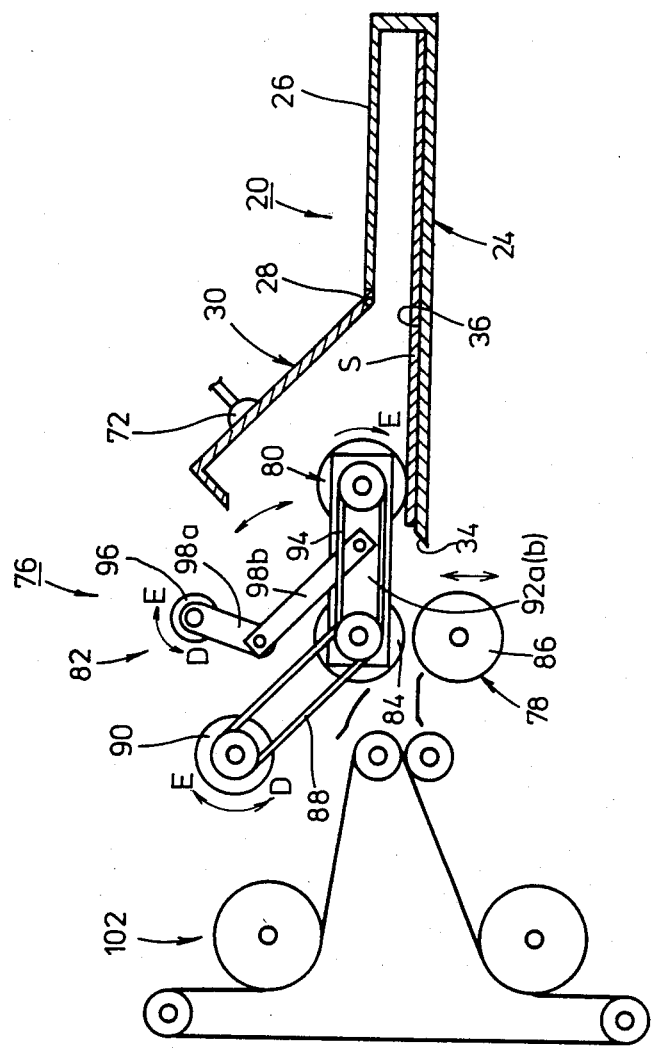
FIG. 6 a schematic side elevational view of a sheet delivery mechanism in the image reading device illustrated in FIG. 5.

A sheet delivery mechanism 76 is disposed closely to the cassette holder 66. As shown in FIG. 6, the sheet delivery mechanism 76 is basically composed of a roller pair 78 for gripping and delivering a stimulable phosphor sheet S, a delivery roller 80 operatively coupled to the roller pair 78 and frictionally contacting the sheet S for delivering the same, and swinging means 82 for swinging the delivery roller 80 to displace the same with respect to the cassette 20.

The roller pair 78 includes a first roller 84 rotatably supported in the reading device 64, and a second roller 86 pressed against the first roller 84 under the resiliency of a resilient member (not shown). The first roller 84 is operatively coupled to a rotative drive source 90 through a drive belt 88. The first roller 84 has opposite ends coupled to respective ends of plate-like arms 92a, 92b. The delivery roller 80 is rotatably supported on the other ends of the arms 92a, 92b. The first roller 84 and the delivery roller 80 are operatively coupled to each other by a belt 94. The swinging means 82 is operatively coupled to the arm 92a. More specifically, the swinging means 82 includes a rotative drive source 96 coupled to one end of a first link 98a, the other end of which is coupled to one end of a second link 98b that is supported at the other end thereof to the arm 92a at its substantially intermediate portion.

First feed means 102 including a feed conveyor 100 (FIG. 5) is disposed in the vicinity of the sheet delivery mechanism 76. As shown in FIG. 5, the first feed means 102 is disposed above a first stacker 104 for temporarily storing the stimulable phosphor sheet S taken out of the cassette 20, the first stacker 104 having a plurality of sheet storage units 103 each for storing one stimulable phosphor sheet S therein. The first stacker 104 is movable in the direction of the arrow A by a motor or the like (not shown). The stimulable phosphor sheet S stored in each sheet storage unit 103 is placed on a bottom plate (not shown) thereof. By turning this bottom plate, the stimulable phosphor sheet S can be fed to a feed belt 110 through a feed belt 108 serving as second feed means 106 located downwardly of the first stacker 104. The feed belt 110 has an end positioned closely to a reader 112.

The reader 112 includes third feed means 114 for feeding the stimulable phosphor sheet S in the direction of the arrow B (i.e., the auxiliary scanning direction) and scanning means 118. The scanning means 118 includes a laser beam source 120 for emitting a laser beam 122 which is scanned over the stimulable phosphor sheet S by a mirror 124 and a galvanometer mirror 126. A reflecting mirror 128 is disposed above the third feed means 114 for collecting light emitted from the stimulable phosphor sheet S which is scanned by the laser beam 122 in the main scanning direction. A light guide 130 is disposed along the main scanning line above the position where the sheet S is scanned. A photomultiplier 132 is mounted on the upper end of the light guide 130.

The third feed means 114 comprises a feed belt 133 followed by a feed belt 134 including a horizontal portion and a vertical portion that is held in sliding contact with another feed belt 136 serving as fourth feed means 139. A pair of feed belts 138a, 138b held in sliding contact with each other is positioned upwardly of the feed belt 134. Two roller pairs 140, 142 spaced from each other in the vertical direction are positioned above the feed belts 138a, 138b, with an erasure unit 144 located between the roller pairs 140, 142. The erasure unit 144 has a plurality of erasing light sources 146 such as sodium vapor lamps, tungsten lamps, or xenon lamps for completely erasing any radiation image remaining on the stimulable phosphor sheet S from which the radiation image has been read in the reader 112.

The roller pair 142 is disposed below fifth feed means 147 comprising a feed belt 148 including a horizontal upper portion and a vertical lower portion held in sliding contact with a short feed belt 150. The horizontal upper portion of the feed belt 148 is located adjacent to sixth feed means 154 including a feed belt 152. The stimulable phosphor sheet S that has reached the sixth feed means 154 is angularly dispaced 180° so as to be fed into a second stacker 156.

The second stacker 156 is of a structure identical to that of the first stacker 104. The second stacker 156 includes a plurality of sheet storage units 158 and is movable in the direction of the arrow C by a motor or the like. The second stacker 156 is positioned above a roller pair 159 disposed near seventh feed means 160 which feeds the stimulable phosphor sheet S supplied from the second stacker 156 to an auxiliary erasure unit 162 comprising an erasing light source 164. The stimulable phosphor sheet S that has passed through the auxiliary erasure unit 162 is stored into the cassette 20 by the sheet delivery mechanism 76.

A process of loading the cassette 20 into the radiation image information reading device 64 will be described below.

As shown in FIG. 5, when the cassette 20 is loaded into the cassette holder 66 in the reading device 64, the engaging pins 68a, 68b of the fixing means of the cassette holder 66 are fitted respectively into the holes 42a, 42b of the casing 24 to hold the cassette 20 in position. Then, the unlocking means 70 is actuated to displace the presser pins 74a, 74b vertically upwardly into the holes 40a, 40b, respectively, until the presser pins 74a, 74b abut against the second locking members 58a, 58b. The presser pins 74a, 74b are continuously displaced upwardly to slidingly engage the respective slanted surfaces 59a, 59b of the second locking members 58a, 58b, whereupon the locking fingers 52a, 52b are displaced in the direction of the arrow (see FIGS. 3 and 4) against the resiliency of the coil springs 60a, 60b. Therefore, the lock means 46a, 46b are released. The suction cup 72 of the cover opening/closing means is operated to lift the cover 30 for thereby opening the cassette 20 in the reading device 64. After the cover 30 has been opened, the unlocking means 70 is actuated to displace the presser pins 74a, 74b vertically downward.

Then, the sheet delivery mechanism 76 is operated. As shown in FIG. 6, the rotative drive source 96 of the swinging means 82 is energized to turn the first link 98a in the direction of the arrow D. The arm 92a is swung downwardly about the first roller 84 by the second link 98b engaging the first link 98a to move the delivery roller 80 into abutment against the stimulable phosphor sheet S in the cassette 20. The rotative drive source 90 is then energized to displace the drive belt 88 in the direction of the arrow E for thereby rotating the first roller 84 of the roller pair 78 in the direction of the arrow E. The delivery roller 80 is now rotated by the belt 94 trained around the first roller 84. Therefore, the stimulable phosphor sheet S is taken out of the cassette 20 by the rotating delivery roller 80 toward the roller pair 78 where the stimulable phosphor sheet S is gripped between the first roller 84 and the second roller 86 which is engaged by a resilient member, not shown. Since the first roller 84 is being rotated in the direction of the arrow E by the rotative drive source 90, the stimulable phosphor sheet S gripped by the roller pair 78 is delivered toward the first feed means 102 by the roller pair 78 and the delivery roller 80.

The rotative drive source 96 of the swinging means 82 is rotated in the direction of the arrow E to enable the links 98a, 98b to turn the arm 92a upwardly for lifting the delivery roller 80 supported by the arms 92a, 92b away from the cassette 20.

The stimulable phosphor sheet S is fed vertically downwardly by the first feed means 102 into one of the sheet storage units 103 of the first stacker 104. The stimulable phosphor sheet S thus fed or a stimulable phosphor sheet S stored in another sheet storage unit 103 is then fed toward the second feed means 106. The stimulable phosphor sheet S is then fed toward the reader 112 by the second feed means 106 and the feed belt 110.

The stimulable phosphor sheet S that has arrived at the reader 112 is fed in the auxiliary scanning direction (indicated by the arrow B) by the feed belt 133 of the third feed means 114, and at the same time the scanning means 118 is energized. The laser beam 122 emitted from the laser beam source 120 is reflected by the mirror 124 to the galvanometer mirror 126, which is swung to scan the laser beam 122 over the sheet S. Light emitted from the sheet S upon exposure to the laser beam 122 is directly applied, or is reflected by the reflecting mirror 128, to the light guide 130, and then is converted by the photomultiplier 130 to an electric signal that is supplied to an image recording device or the like.

The stimulable phosphor sheet S from which the recorded radiation image has been read is fed to the roller pair 140 by the feed belt 134, the fourth feed means 139 including the feed belt 136, and the feed belts 138a, 138b, and then fed by the roller pair 140 into the erasure unit 144. In the erasure unit 144, the erasing light sources 146 are energized to apply light to the stimulable phosphor sheet S for completely erasing remaining radiation image therefrom. The stimulable phosphor sheet S which has left the erasure unit 144 is fed vertically upwardly by the feed belts 148, 150 of the fifth feed means 147, and then is directed horizontally to reach the sixth feed means 154. The stimulable phosphor sheet S is turned 180° in its direction of feed by the sixth feed means 154, and stored into one of the sheet storage units 158 of the second stacker 156.

The stimulable phosphor sheet S that has been taken out of the cassette 20 and stored in the sheet storage unit 158 is thereafter fed by the roller pair 159 to the seventh feed means 160, by which the sheet S is moved across the auxiliary erasure unit 162. The stimulable phosphor sheet S is subjected to secondary image erasure in the auxiliary erasure unit 162, after which the stimulable phosphor sheet S is fed to the sheet delivery mechanism 76.

As shown in FIG. 6, when the rotative drive source 90 is rotated in the direction of the arrow D, the first roller 84 is also rotated in the direction of the arrow D by the belt 88 engaging the rotative drive source 90. Therefore, the stimulable phosphor sheet S gripped by the roller pair 78 is delivered into the cassette 20 by the rotation of the first roller 84. The rotative drive source 96 of the swinging means 82 is then rotated in the direction of the arrow D to cause the links 98a, 98b to displace the delivery roller 80 into the cassette 20, thereby contacting the stimulable phosphor sheet S. The stimulable phosphor sheet S is moved into the cassette 20 by the roller pair 78 and the delivery roller 80 until finally the sheet S is fully stored in the cassette 20 by the delivery roller 80.

After the stimulable phosphor sheet S has been stored in the cassette 20, the swinging means 82 is operated to move the delivery roller 80 away from the cassette 20.

The suction cup 72 is moved downwardly to close the cover 80. The first locking members 56a, 56b of the locking fingers 52a, 52b engage the locking ledge 89a of the side wall 24a, and then the locking fingers 52a, 52b are displaced in the direction of the arrow in FIG. 4 against the resiliency of the coil springs 60a, 60b. When the cover 30 fully closes the chamber 22 in the casing 24, the first locking members 56a, 56b are released from the respective ledges 39a, 39b, whereupon the locking fingers 52a, 52b are resiliently displaced toward the side wall 24a under the bias of the coil springs 60a, 60b. The cover 30 is now locked in position by the lock means 46a, 46b. Then, the fixing means is operated to pull the engaging pins 68a, 68b out of the holes 42a, 42b of the casing 24. Thereafter, the cassette 20 is removed from the cassette holder 66. If necessary, a new cassette 20 which stores therein a stimulable phosphor sheet S with image information recorded is loaded into the cassette holder 66.

In order for the operator to open the cover 30, the levers 54a, 54b projecting from the openings 50a, 50b of the cover 30 are manually pushed against the bias of the coil springs 60a, 60b to release the lock means 46a, 46b.

In the present embodiment, the cover 30 of the cassette 20 is of a length that can be selected to be large enough to take out the sheet S from the cassette 20. Therefore, the space required in the reading device 64 to open and close the cover 30 can be reduced as much as possible. The covers 30 in cassettes 20 of various different sizes may be of the same length so that the cover opening/closing mechanism including the suction cup 72 may operate in the same manner irrespective of the different sizes of the cassettes 20, with the result that suction failure of the suction cup 72 which would otherwise be caused by the different lengths of the covers 30 will be avoided.

The surface 34 defining the film removal slot 32 of the casing 24 of the cassette 20 is contiguous to the inner surface 36 of the casing 24 and inclined in the direction away from the cover 30. Accordingly, the stimulable phosphor sheet S can be horizontally slid out of the cassette 20. The stimulable phosphor sheet S can reliably be taken out of and into the cassette 20 even where the sheet delivery mechanism 76 is of a relatively simple construction as shown. Additionally, the sheet delivery mechanism 76 may be replaced with a simple delivery mechanism including a suction cup for taking the stimulable phosphor sheet S into and out of the cassette 20.

Figure 7:
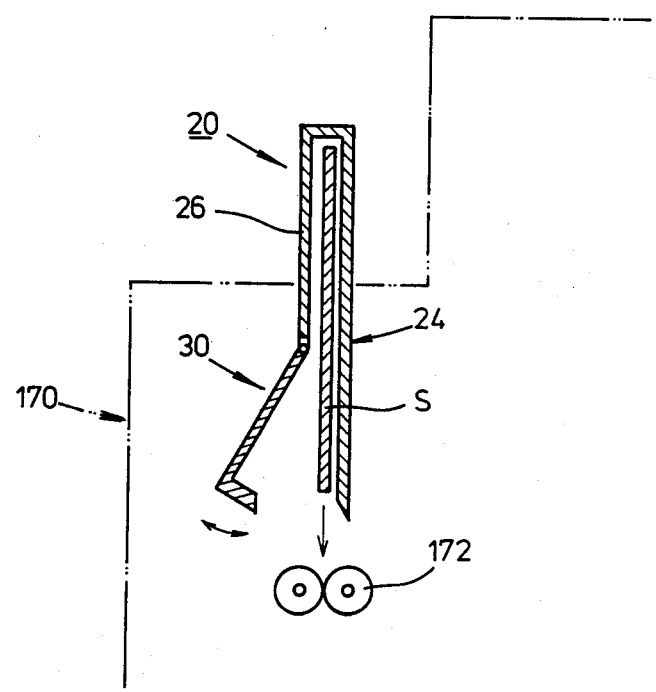
FIG. 7 is a schematic view showing the manner in which the cassette of the invention is loaded into another image reading device.

The cassette 20 with the sheet removal slot 32 in the casing 24 may be loaded in an erected condition into an image reading device or the like. More specifically, as shown in FIG. 7, the cassette 20 is inserted in an erected condition into an image reading device 170 to a prescribed length, and then a suction cup or the like in the image reading device 170 is actuated to open the cover 30. The stored stimulable phosphor sheet S is then allowed to drop from the cassette 20 and gripped by a feed roller pair 172, by which the sheet S is fed to a scanning reader. Since the cassette 20 is required to be inserted into the image reading device 170 only to the extent that the cover 30 can be opened and closed in the image reading device 170, the space taken up by a cassette holder in the image reading device 170 is greatly reduced, and hence the image reading device 170 is of a reduced size.

The lock means 46a, 46b of the cassette 20 can be released by the presser pins 74a, 74b of the unlocking means 70 in the reading device 64 and can also be released by presser pins 174a, 174b as indicated by the two-dot-and dash lines in FIG. 4. Therefore, the lock means 46a, 46b can be unlocked either by the vertically movable presser pins 74a, 74b or the horizontally movable presser pins 174a, 174b. As a consequence, the position of the unlocking means 70 in the reading device 64 may be selected appropriately. More specifically, since the sheet delivery mechanism 76 is positioned near the cassette holder 66 as shown in FIG. 5, it would be structurally difficult to provide unlocking means including the presser pins 174a, 174b for releasing the lock means 46a, 46b through the holes 38a, 38b of the casing 24. In the structure of FIG. 5, there is a relatively large space present below the cassette 20 in the reading device 64. Consequently, the unlocking means 70 disposed downwardly of the cassette 20 is not in physical interference with the other mechanisms or components in the reading device 64.

Even where the reading device 64 for loading the cassette 20 therein has various mechanisms, the position of the unlocking means 70 may freely be selected, and the reading device 64 may be simplified in structure and reduced in size.

With the present invention, as described above, the cassette includes the casing for storing a stimulable phosphor sheet and the cover openably and closably mounted on the casing, the cover not extending over the entire casing but being of only such a length as to be able to take out the stimulable phosphor sheet from the casing. Accordingly, the space in the reading device for allowing opening and closing movement of the cover is reduced. It is not necessary to load the cassette fully into the reading device, but the cassette may be inserted into the reading device only to the extent that the cover can be opened and closed in the reading device. As a consequence, the space required in the reading device for storing the cassette is greatly reduced, and the reading device is of a small size in its entirety.

The distal end of the cover which is movable away from and toward the casing projects toward the casing, and the casing has the sheet removal slot. The reading device in which the cassette can be loaded is not required to have a sheet delivery mechanism which moves in a complex pattern for taking the stimulable phosphor sheet out of the cassette. Rather, the stimulable phosphor sheet can easily be taken out of or into the cassette by bringing a rotating delivery roller into contact with the stimulable phosphor sheet. The cassette may be loaded in a selected attitude into the reading device. For example, it may be loaded in an erected condition into the reading device.

The lock means for locking the cover on the casing in a closed position may be released in at least two directions. Thus, the position of the unlocking means in the reading device may appropriately be selected so that the unlocking means will not physically interfere with other mechanisms such as the delivery mechanism in the reading device. As a result, the cassette may be loaded in a selected one of various attitudes, and the reading device for loading the cassette therein may be reduced in size while allowing various mechanisms to be incorporated therein.

Although certain preferred embodiments have been shown and described, it should be understood that many changes and modifications may be made therein without departing from the scope of the appended claims.

What is claimed is:

1. A cassette for a stimulable phosphor sheet, comprising a casing for storing the stimulable phosphor sheet therein, a cover openably and closably mounted on a portion of said casing, a light-shielding plate mounted on the remaining portion of said casing for cooperating with said cover in keeping the stored stimulable phosphor sheet in a light-shielded condition, and lock means for locking the cover on said casing in a closed position, the arrangement being such that after releasing said lock means the stimulable phosphor sheet can be taken out of said casing by opening said cover and further comprising means for releasing said lock means in at least two different directions.

2. A cassette according to claim 1, wherein said cover has a projection at an end thereof movable toward and away from said casing, said projection projecting toward said casing and having a width greater than that of the stimulable phosphor sheet, said casing having a recess in which said projection can closely fit, said cover being openable to define a space between said projection and said recess for allowing the stimulable phosphor sheet to be taken out of said casing through said space.

3. A cassette according to claim 2, wherein said casing has a surface defining said recess, said surface being contiguous to an inner surface of said casing and inclined in a direction away from said cover.

4. A cassette according to claim 1, wherein said casing has at least one locking opening, said casing being positionable in a device through said opening.

5. A cassette according to claim 1, wherein said cover has at least one said lock means, said lock means comprising a resilient member and a locking finger normally urged by said resilient member to be pressed into engagement with said casing to lock said cover on said casing, said casing having a hole defined in a side thereof or a bottom thereof confronting said cover, further including a presser pin insertable through said hole to displace said locking finger against the resiliency of said resilient member to unlock said cover from said casing.

6. A cassette according to claim 5, wherein said locking finger has a first pressing surface engageable with said presser pin inserted through the hole defined in said side of the casing and a second pressing surface engageable with said presser pin inserted through the hole defined in said bottom of said casing, said second pressing surface being inclined in a direction away from said casing toward said presser pin.

7. A cassette according to claim 5 or 6, wherein said cover has an opening, said lock means further including a lever joined to said locking finger and extending through said opening, said lock means being releasable by pushing said lever.

8. A cassette for a stimulable phosphor sheet, comprising a casing for storing the stimulable phosphor sheet therein, a cover openably and closably mounted on a portion of said casing, and a light-shielding plate mounted on the remaining portion of said casing for cooperating with said cover in keeping the stored stimulable phosphor sheet in a light-shielded condition, the arrangement being such that the stimulable phosphor sheet can be taken out of said casing by opening said cover, wherein said cover has a projection at an end thereof movable towards and away from casing, said projection projecting towards said casing and having a width greater than that of the stimulable phosphor sheet, said casing having a recess in which said projection can closely fit, said cover being openable to define a space between said projection and said recess for allowing the stimulable phosphor sheet to be taken out of said casing through said space.

9. A cassette according to claim 8, further comprising means for detachably mounted said light-shielding plate on said casing.

10. A cassette according to claim 8, wherein said casing has an opening for reading therethrough an indicia on the stimulable phosphor sheet.

11. The cassette according to claim 8, wherein said casing has a surface defining said recess, said surface being contiguous to an inner surface of said casing and inclined in a direction away from said cover.

12. A cassette according to claim 8, further comprising lock means for locking the cover on said casing in a closed position, the arrangement being such that after releasing said lock means the stimulable phosphor sheet can be taken out of said casing by opening said cover.

13. A cassette for a stimulable phosphor sheet, comprising a casing for storing the stimulable phosphor sheet therein, a cover openably and closably mounted on a portion of said casing, and a light-shielding plate mounted on the remaining portion of said casing for cooperating with said cover in keeping the stored stimulable phosphor sheet in a light-shielded condition, the arrangement being such that the stimulable phosphor sheet can be taken out of said casing by opening said cover, wherein said casing has at least one locking opening, said casing being positionable in a device through said opening.

14. A cassette for a stimulable phosphor sheet, comprising a casing for storing the stimulable phosphor sheet therein, a cover openably and closably mounted on a portion of said casing, and a light-shielding plate mounted on the remaining portion of said casing for cooperating with said cover in keeping the stored stimulable phosphor sheet in a light-shielded condition, the arrangement being such that the stimulable phosphor sheet can be taken out of said casing by opening said cover, wherein said cover has an opening for reading therethrough an indicia on the stimulable phosphor sheet.

* * * * *